(12) United States Patent
Saddik et al.

(10) Patent No.: US 9,519,348 B2
(45) Date of Patent: Dec. 13, 2016

(54) HAPTIC FORCE-FEEDBACK FOR COMPUTING INTERFACES

(71) Applicant: New York University, New York, NY (US)

(72) Inventors: Abdulmotaleb El Saddik, Ottawa (CA); Mohamad Eid, Abu Dhabi (AE)

(73) Assignee: New York University, New York, NY (US)

( * ) Notice: Subject to any disclaimer, the term of this patent is extended or adjusted under 35 U.S.C. 154(b) by 25 days.

(21) Appl. No.: 14/467,681

(22) Filed: Aug. 25, 2014

(65) Prior Publication Data

US 2015/0054635 A1 Feb. 26, 2015

Related U.S. Application Data

(60) Provisional application No. 61/869,965, filed on Aug. 26, 2013.

(51) Int. Cl.
*G06F 3/01* (2006.01)
*G06F 3/0354* (2013.01)
*G06F 3/0487* (2013.01)

(52) U.S. Cl.
CPC .......... *G06F 3/016* (2013.01); *G06F 3/03546* (2013.01); *G06F 3/03545* (2013.01); *G06F 3/0487* (2013.01)

(58) Field of Classification Search
CPC .... G06F 3/016; G06F 3/0487; G06F 3/03546; G06F 3/03545
See application file for complete search history.

(56) References Cited

U.S. PATENT DOCUMENTS

| | | | |
|---|---|---|---|
| 6,876,891 B1* | 4/2005 | Schuler | G05B 19/108 318/561 |
| 2008/0173000 A1* | 7/2008 | Skinner | A01D 69/002 56/16.9 |
| 2009/0076723 A1* | 3/2009 | Moloney | G01C 21/3652 701/472 |
| 2010/0079376 A1* | 4/2010 | Lou | G06F 3/0383 345/166 |
| 2014/0002362 A1* | 1/2014 | Srivastava | G06F 3/03549 345/167 |

* cited by examiner

*Primary Examiner* — Hongmin Fan
(74) *Attorney, Agent, or Firm* — Foley & Lardner LLP

(57) ABSTRACT

Methods, systems, and apparatuses, including computer programs encoded on computer-readable media, provide two degrees of freedom active force feedback for touch-screens or any other general surface. The system includes a rubber ball attached to a pen-like structure with two motors that are capable of rotating freely when external force is applied. The system has also a mechanical structural arrangement including gears and cables to transfer motor power to engage the rubber ball. The system further includes a digital compass to measure the device tilt, along with a processing unit to control the system and a wireless communication module and a power module.

13 Claims, 4 Drawing Sheets

HAPTIC FORCE-FEEDBACK FOR COMPUTING INTERFACES

CROSS-REFERENCE TO RELATED APPLICATIONS

This application claims priority to U.S. Provisional App. No. 61/869,965 filed Aug. 26, 2013, which is hereby incorporated by reference in its entirety.

BACKGROUND

Haptic or force feedback devices have been utilized in various fields. Typically such devices provide the user with a touch-sensory type of feedback. While some devices have provided a user with tactile feedback through interaction with a surface, such as a touch screen, such devices have typically been vibratory or passively reactive. This latter group include devices such as pens that alter the ease with which a pen can travel across a surface.

SUMMARY

In general, one aspect of the subject matter described in this specification can be embodied in a haptic device. The haptic device comprises a housing and an actuation mechanical structure. The actuation mechanical structure includes a ball partially disposed within the housing with a portion extending beyond the housing. The actuation mechanical structure further includes a first motor and an associated first drive train in communication with the ball for rotating the ball about a x-axis and a second motor and an associated second drive train in communication with the ball for rotating the ball about a y-axis that is perpendicular to the x-axis. The haptic device also includes a gyroscope and a microcontroller in communication with a memory module, a communication module, the first motor and the second motor, and a power module.

One aspect of the subject matter described in this specification can be embodied in a method of providing feedback with a haptic device that includes a ball engagable with a surface. The position of haptic device is determined relative to an x-y plane defined by the surface. Based upon the determined position, one or both of a first motor and a second motor of the haptic device are engaged. The ball is rotated in a direction based upon the determined position, rotation of the ball against the surface applying motive force to the haptic device, wherein the motive force provides feedback.

One aspect of the subject matter described in this specification can be embodied in a non-transitory computer-readable memory having instructions stored thereon. The instructions comprise instructions for: determining the position of haptic device relative to an x-y plane defined by the surface; for, based upon the determined position, engaging one or both of a first motor and a second motor of the haptic device; for rotating the ball in a direction based upon the determined position, rotation of the ball against the surface applying motive force to the haptic device wherein the motive force provides feedback.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
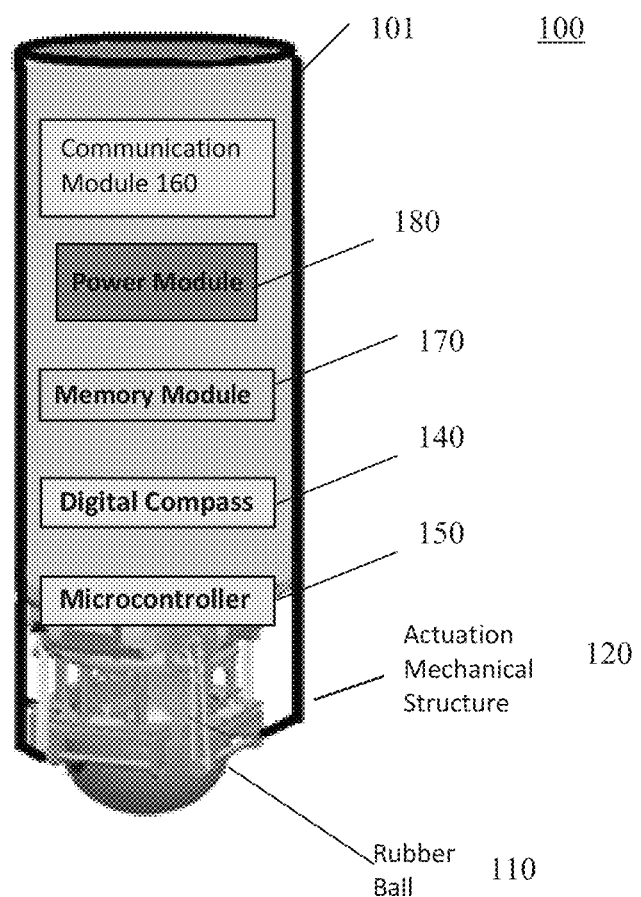
FIG. 1 is structure diagram for a system according to an implementation.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

One implementation described herein relates to a device having haptic force feedback. In particular, the haptic device may be suitable for hand-held use, such as having a writing utensil-like form factor. In one implementation, the haptic device provides two degrees of freedom (DoF) active force feedback for touchscreens by applying friction (reactional force).

In one implementation illustrated in FIG. 1, the haptic device 100 comprises housing 101. The housing 101 may define the form factor for the haptic device 100. For example, the housing 101 may be in the shape of a writing utensil. In one implementation, a ball 110, such as a rubber ball, and an actuation mechanical structure 120 are included in the haptic device 100. The mechanical structure 120 is, in one implementation, composed of a first motor 121 and a first motor drive train 122 and a second motor 131 and a second motor drive train 132. The two motors 121, 131 are able to rotate freely if external force is applied. Each of the drive trains 122, 131 comprise two bevel gears 123a, 123b, 133a, 133b, two cables 126, 136 to transfer motor power 124, 134, two wheels 125, 135 to drive the ball 110, and four axes (two for each wheel) to hold bevel gears 123, 133 and wheels. In one implantation, a digital compass or gyroscope 140 is provided to measure the 3D tilt of the device 100. A microcontroller unit 150 is configured to control the mechanical structure. A communication module 160 may be included that enables wired and/or wireless communication between the device 100 and another device, such as a personal computer, a tablet computer, or a smart phone. In one implementation a memory module 170 is provided within the housing 101 to store program instructions to be executed by the microcontroller 150. In one implementation, a power module 180 (e.g., a battery) is provided that supplies the various components with the required electric power.

In one implementation, the haptic device includes an actuation circuit 105 that generates the force feedback. The actuation circuit comprises mechanical and electrical components. The ball 110 can be made of various materials. For example, the ball 110 is, in one implementation, a metal ball covered by thick conductive rubber Sheet with low "Shore A hardness" to provide high friction. Alternatively, a traditional mouse ball can also be used.

In one implementation, motive force is provided to the ball 110 by two motors. Any controlled speed motor that is able to rotate freely if external force is applied. It should be appreciated that voltage and current depends on the microcontroller circuit 150.

Each motor 121, 131 drives a respective first drive gear 123A, 133A that then engages and drives a second drive gear 123B, 133B. For example, as shown in FIG. 2, the first drive gear 123A, 133A is oriented to rotate in the same direction as the respective motor (z-axis), and the second drive gear 123b, 133b is oriented perpendicular to the first drive gear 123a, 133a to effectuate a change in the direction of the rotation to the x for the first motor 121 and the y direction for the second motor 131.

In one implementation, the drive train 122, 132 each include a drive belt, 192, 193 to drive an wheel 125, 125.

In one implementation, the first gear 123A, 133A is affixed to an axle 127, 137 of the motor. The second gear 123B, 133B is attached a second axle 128, 138. A third axle 129, 139 supports the wheel 125, 135.

The two wheels 125, 135 drive the ball 110 (Anisotropic Friction Wheels or Omni-directional wheel). In one implementation, the wheel consists of wheel rim made of low friction material (i.e., 83 Shore Scale D), a thin strip of high friction material (i.e., 27 Shore Scale A), and a series of bendable nodes. Lower value on Shore scale implies softer material and, eventually, a higher friction coefficient.

The microcontroller 150 is configured for communication with the Communication Module 160 and the Memory Module 170, and for controlling the Actuation Circuit 105. In one implementation, the microcontroller 150 receives force information from a remote application as in on a remote device, such a smart phone, PC, or tablet (via the Communication Module 160) and retrieves information from the gyroscope 140 and generates the actuation signal(s) that control the two motors 121, 131. Furthermore, the microcontroller 150 can read the force information from the local Memory Module 170 (in case of a haptic playback) and can store any related data in the local Memory Module 170. In one implementation the microcontroller 150 is a Pololu Baby Orangutan B-328 Robot Controller. It is able to rotate two DC motors in both directions. 256 different speeds.

The gyroscope 140 is used to measure the 3D tilt of the haptic device 100 in order to calibrate its orientation for optimized haptic rendering. The coordinate of the haptic device 100 is not always aligned to an associated device' touch screen's coordinate. The haptic device's 100 z-direction rotation is monitored through the gyroscope 140 so the haptic device's 100 x-y direction is aligned to touch screen's x-y direction. In one implementation, a calibration process is needed to align the haptic device 100 to touch screen's x-y direction at the beginning of the session. In one implementation, the gyroscope 140 is a Devantech CMPS10.

The Memory Module 170 acts as a datastore for the haptic device 100. Interaction information can be stored locally (in case the Communication Module 160 is deactivated). The haptic device 100 can also store haptic playback data that can be retrieved and played-back to the user whenever needed. Other data that can be stored in the Memory Module 170 include, but not limited to, manufacturer's and/or owner's credentials, security related information (such as user authentication data), or current user's information.

The Power Module 180 is in charge of providing the necessary electric power to operate the haptic device 100 components (such as driving the motors, powering the microcontroller and the Memory Module 170, and the Communication module 160).

The communication module 160 connects the haptic device 100 to a host computer (or another device) that implements a host application program or graphical environment that the haptic device 100 will interact with. The Communication module 160 implements either a wired or wireless communication scheme. However, to enhance the pervasiveness of the haptic device 100, in one implementation, a wireless module (i.e., Zigbee or Bluetooth) can be utilized to provide higher flexibility to connect to any likewise-enabled device.

Force Feedback Actuation Mechanism

Figure 2A:
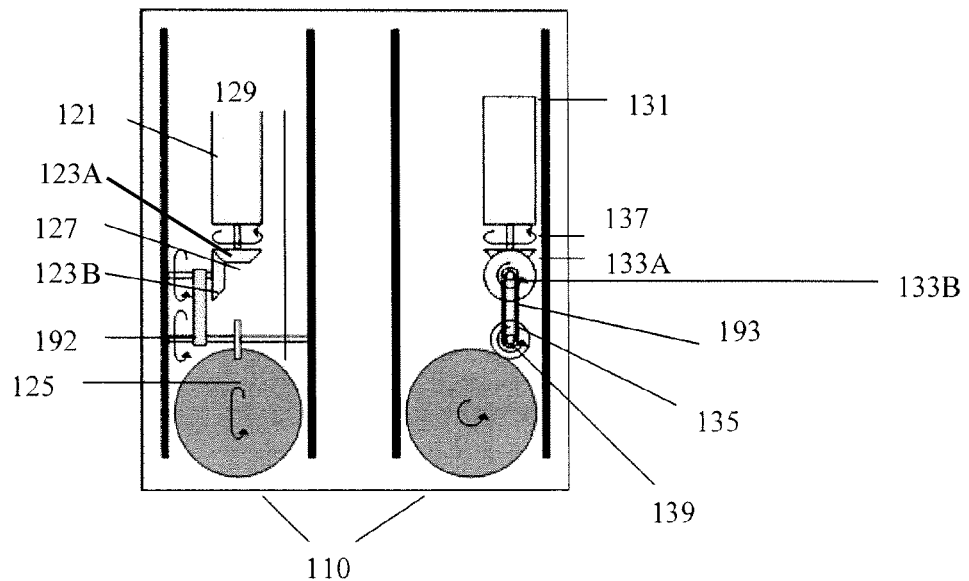
FIG. 2A illustrates one implementation for converting z-direction to x or y directions.

In one implementation as shown in FIG. 2A, the force feedback actuation works as follows: the ball 110 is controlled by two perpendicular servo motors 121, 131 through respective drive trains 122, 132 having gear and belt mechanisms. The vertical motors 121, 131 generate rotation about the z direction which is converted to the x or y directions (depending on the position of the motor and drive train) using the drive train. Finally, the belt transfers the power to the third axle to drive a wheel 125, 135 which eventually cause the ball 110 to rotate and move. Note that the friction between the wheels 125, 135 and the ball should be high enough for the user to feel the force feedback.

In one implementation, in order to locate a tooltip, two mechanisms can be implemented: resistive touchscreen display and capacitive touchscreen display. Resistive touchscreen displays are composed of multiple layers that are separated by thin spaces. Pressure applied to the surface of the display by the haptic device causes the layers to touch, which completes electrical circuits and the location where the user is touching can be determined. As such, resistive type touchscreens require much more pressure to activate than capacitive touchscreens.

On the other hand, the capacitive touchscreen display consists of an insulator such as glass, coated with a transparent conductor. For implementations where the haptic device 100 has a surface that is an electrical conductor, touching the surface of the screen using the pen results in a distortion of the screen's electrostatic field, measurable as a change in capacitance, and thus the contact point can be determined. Note, in one implementation that the ball 110, the housing 101, and the structure 120 connecting the ball to the case are all conductive. Therefore, the hand electricity can be transferred onto the screen and the tooltip position can be acquired.

Figure 2B:
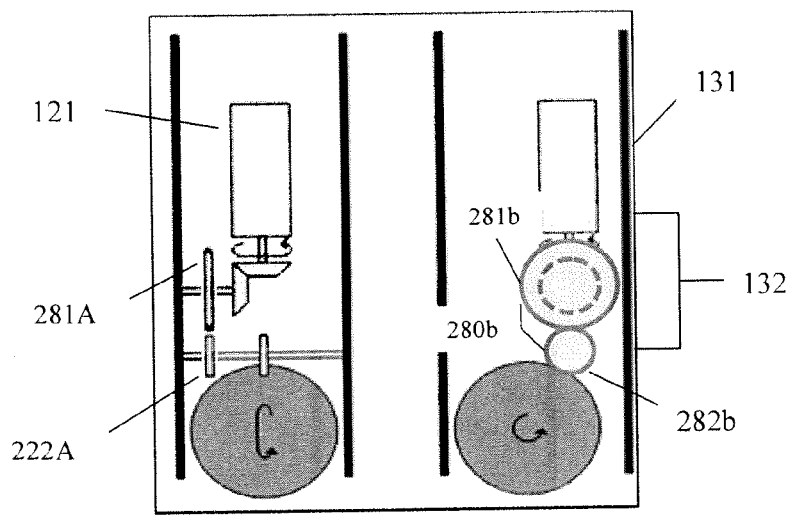
FIG. 2B illustrates an alternative implementation for converting z-direction to x or y directions.

FIG. 2B illustrates an alternative implementation of the actuation mechanical structure 120. In the implementation of FIG. 2B, a compound gear system 280 transmits mechanical power. Each compound gear 280a, 280b is made of two gears 281a, 281b, 282a, 282b fixed together; consequently they rotate at the same speed. Note that multiple compound gears can be utilized simultaneously depending on the distance between the locations of the drive motors 121, 131 and the ball 110.

Figure 3:
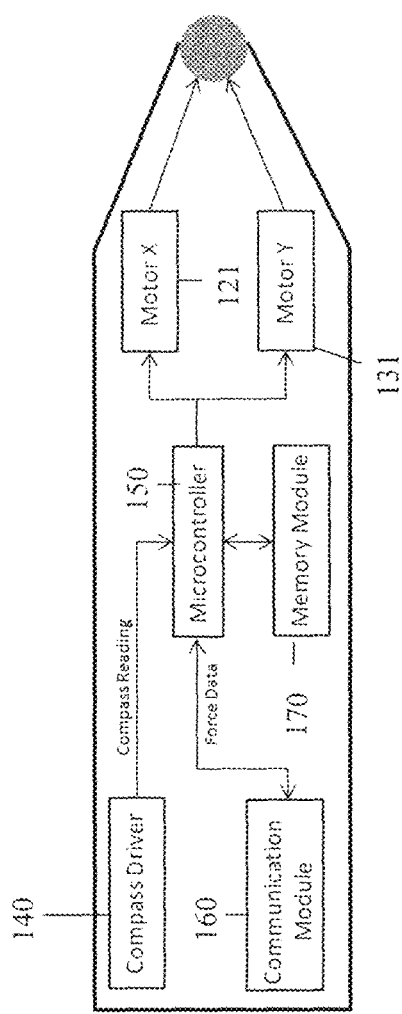
FIG. 3 illustrates one implementation with functional design components within a housing.

FIG. 3 shows a functional diagram of one implementation of a haptic device 100. The system works as follows: Once the device is turned on, the Bluetooth device (implementation of the communication Module 160) discovers and connects to a remote Bluetooth enabled device where the application resides. The user then holds the device 100 in a particular orientation where the gyroscope 140 calibrates the orientation of the haptic device 100 in the screen plane (xy-plane). Now the haptic device 100 is ready to use. The communication Module 160 receives force direction and magnitude information from the application, de-packetize the data, and forwards the data to the Microcontroller 150 that generates the control signal to drive the two motors (Motor 121 and motor 131). In the playback scenario, the force data would be locally stored in the Memory Module 170 and are retrieved by the Microcontroller 150.

In one implementation, the actuation mechanical structure 120 is applying resistance to the ball 110 to slow or stop the ball 110 from rotating thereby providing feedback to the user.

In an alternative implementation, the ball 110 is actively rotated by the actuation mechanical structure 120, which in effect applies force from within the haptic device 100 to cause the device 100 to move in a direction other than that causes by the forces applied by the user. For example, if a user drags the haptic device 100 into a prohibited zone of the screen the device 100 could be propelled back to the nearest non-prohibited point In this implementation, the two motors 121, 131 generate torque around the x and y directions of the writing surface using the bevel gear 123, 133. With friction between the ball 110 and the handwriting surface, the torque force is transformed into translational forces to move the pen in a particular direction. It can also be used to resist motion by combining x and y directional forces along the surface. This is referred to as being a "reactional" force because it is dependent on the friction of the touched surface. In case the surface has a zero or near zero friction, none of the torque force will be transformed into translational force and thus the user won't feel any force feedback. The proposed system still provides resistive as well as proactive haptic feedback. For instance, if the user moves the haptic device 100 to a prohibited area, then the ball 110 actively moves the haptic device 100 away to the nearest non-prohibited area. In one implementation, the ball 110 will actively roll back to the last non-prohibited position that the device was located. In another implementation, the device utilizes an algorithm to track pen movements and derive obstacle path avoidance. This feature can be also used to facilitate locating fine objects on an interactive display such as sliding the haptic device 100 towards/away from specific dots that might be more difficult to locate with only visual feedback.

In one implementation, the haptic device 100 can be used in various applications such as signature verification, Web surfing, object manipulation, painting and sculpting, gaming, and education tools as further described below.

In one implementation, haptic device 100 user can sign a document using the standard stroke plus the force (pressure) and torque in three dimensions, hence the haptic device 100 can be a good tool for behavioral biometrics.

In one implementation the haptic device 100 can be used by blind or visually impaired users to access Web contents and surf the Internet. For example, rolling the haptic pen across a link would give a specific friction feedback to the user, a fillable text field would give the feel of 'sliding' the pen to the text field, a submission button has an edge to easily locate, etc. The H-Pen can also be used to interact with standard Graphical User Interface components by associating various friction values to each.

In one implementation using the haptic device 100, the user can feel the edges of a manipulated device (for example, in a Tele-operation task such as Tele-assembly of machines).

In one implementation the haptic device 100 can be used to provide the feel of a painting brush to enrich the painter experience. Furthermore, different colors might be assigned various friction parameters in order to easily distinguish and/or mix them.

In one implementation the user can use the haptic device 100 as a game controller. For example, in a longbow game, the haptic device 100 helps users to feel the resistance of the longbow's string as you pull back an arrow.

In one implementation the haptic device 100 can be used to teach students the physical properties of various objects as well as concepts in physics (such as friction and dynamic friction). It can also be used in learning tool where the user receives haptic cues such as for proper handwriting.

Figure 4:
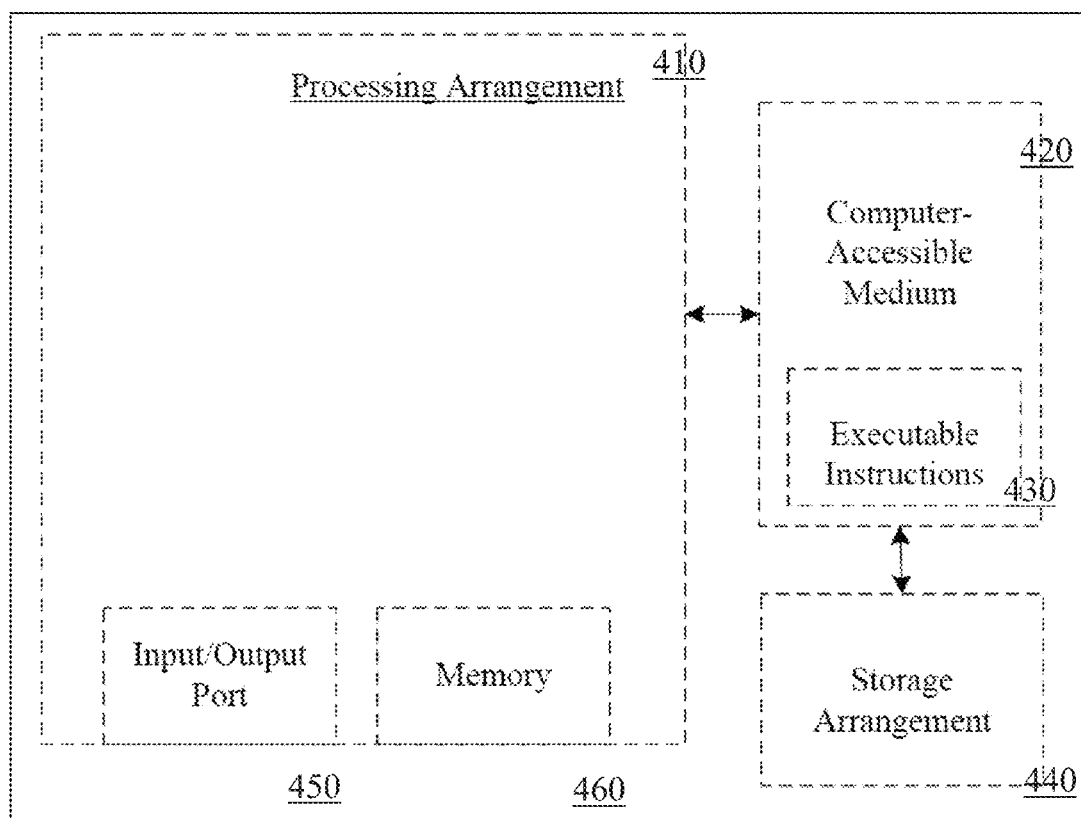
FIG. 4 is a block diagram of a computer system in accordance with an illustrative implementation.

In one embodiment, shown in FIG. 4, a system 400 is provided. FIG. 4 shows an exemplary block diagram of an exemplary embodiment of a system 400 according to the present disclosure. For example, an exemplary procedure in accordance with the present disclosure can be performed by a processing arrangement 410 and/or a computing arrangement 410. Such processing/computing arrangement 410 can be, e.g., entirely or a part of, or include, but not limited to, a computer/processor that can include, e.g., one or more microprocessors, and use instructions stored on a computer-accessible medium (e.g., RAM, ROM, hard drive, or other storage device).

As shown in FIG. 4, e.g., a computer-accessible medium 420 (e.g., as described herein, a storage device such as a hard disk, floppy disk, memory stick, CD-ROM, RAM, ROM, etc., or a collection thereof) can be provided (e.g., in communication with the processing arrangement 410). The computer-accessible medium 420 may be a non-transitory computer-accessible medium. The computer-accessible medium 420 can contain executable instructions 430 thereon. In addition or alternatively, a storage arrangement 440 can be provided separately from the computer-accessible medium 420, which can provide the instructions to the processing arrangement 410 so as to configure the processing arrangement to execute certain exemplary procedures, processes and methods, as described herein, for example.

System 400 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A haptic device comprising:
   a housing;
   an actuation mechanical structure having:
   a ball partially disposed within the housing and rotatable thereto with a portion extending beyond the housing;
   a first motor and an associated first drive train in communication with the ball for rotating the ball about a x-axis, a first motor first drive gear, a first motor second drive gear perpendicular to the first motor first drive gear, and a first motor drive wheel for engaging the ball;
   a second motor and an associated second drive train in communication with the ball for rotating the ball about a y-axis that is perpendicular to the x-axis, a second motor first drive gear, a second motor second drive gear perpendicular to the second motor first drive gear, and a second motor drive wheel for engaging the ball;
   a gyroscope;
   a microcontroller in communication with a memory module, a communication module, the first motor and the second motor, and a power module;
   wherein at least one of direction of rotation and torque of the ball are selected based upon a factor selected from the group consisting of a selected color corresponding to a display on the graphical user interface and a determined position of the haptic device relative to an object displayed on the graphical user interface.

2. The haptic device of claim 1, wherein the first drive train and the second drive train each, respectfully, further comprise a belt drive placing the wheel in communication with the second drive gear such that rotation of the second drive gear is translated to rotation of the drive wheel.

3. The haptic device of claim 1, wherein the first drive train and the second drive train each, respectfully, further comprise a compound gear system configured to translate rotation of the second drive gear to motion of the wheel.

4. The haptic device of claim 1, wherein each of the first motor and second motor drive a respective first axle and second axle which rotation about a z-axis that is perpendicular to both the x-axis and the y-axis.

5. The haptic device of claim 1, wherein the ball is electrically conductive.

6. The haptic device of claim 1, wherein the ball is configured to engage with a surface and to impart motive force to the haptic device through rotation of one or both of the first motor and the second motor translated to the ball such that the ball rotates about an axis in the plane defined by the x-axis and the y-axis.

7. A method of providing feedback with a haptic device that includes a ball engagable with a surface, the method comprising:
   determining the position of haptic device relative to an x-y plane defined by the surface;
   aligning the haptic device's x-v direction with a touch screen's x-v direction;
   based upon the determined position, engaging one or both of a first motor and a second motor of the haptic device;
   rotating the ball in a direction based upon the determined position, rotation of the ball against the surface applying motive force to the haptic device;
   wherein the motive force provides feedback;
   wherein the surface is a graphical user interface displaying content and wherein direction of rotation and torque of the ball are selected based upon the determined position of the haptic device.

8. The method of claim 7, wherein aligning the haptic device's x-y direction further comprises a calibration process having the steps of:
   determining the orientation of the haptic device by a gyroscope module with respect to the x-y plane.

9. The method of claim 7, further comprising determining if the position of the haptic device is within a prohibited area.

10. The method of claim 9, wherein the rotation of the ball is selected to provide motive force to the haptic device to a nearest non-prohibited area.

11. The method of claim 7, wherein the surface is a graphical user interface displaying content and wherein at least one of direction of rotation and torque of the ball are selected based upon a selected color corresponding to a display on the graphical user interface.

12. The method of claim 7, wherein the surface is a graphical user interface displaying content and wherein at least one of direction of rotation and torque of the ball are selected based upon the determined position of the haptic device relative to an object displayed on the graphical user interface.

13. A computer implemented haptic device comprising:
a ball engagable with a surface;
a non-transitory computer-readable memory having instructions stored thereon, the instructions comprising:
instructions for determining the position of haptic device relative to an x-y plane defined by the surface;
instructions for determining if the position of the haptic device is within a prohibited area;
instructions for, based upon the determined position, engaging one or both of a first motor and a second motor of the haptic device;
instructions for rotating the ball in a direction based upon the determined position, rotation of the ball against the surface applying motive force to the haptic device;
wherein the motive force provides feedback and further wherein the surface is a graphical user interface displaying content and direction of rotation and torque of the ball are selected based upon the determined position of the haptic device.

* * * * *